Aug. 5, 1941.   G. HAGEDORN   2,251,877
ELECTRIC RESISTANCE WELDING INSTALLATION
Filed May 26, 1939

Inventor
G. Hagedorn
By: Glascock Downing & Seebold Attys.

Patented Aug. 5, 1941

2,251,877

UNITED STATES PATENT OFFICE 2,251,877

ELECTRIC RESISTANCE WELDING INSTALLATION

Gerhard Hagedorn, Berlin-Lichterfelde, Germany, assignor to Bernhard Berghaus, Berlin-Lankwitz, Germany Application May 26, 1939, Serial No. 275,970
In Germany June 3, 1938

6 Claims. (Cl. 250—36)

The present invention relates to an electric resistance welding installation for medium and high frequencies, the characteristic feature of which is that the medium or high frequency transformer is fed by a tube generator. Fundamentally the tube generator consists of a source of continuous current connected in series with a choking coil, a grid-controlled tube connected in parallel and an oscillatory circuit consisting of a condenser and a welding transformer connected in parallel with the tube. The tube preferably consists of a grid-controlled mercury vapour tube. Moreover, the source of continuous current is connected in parallel with an accumulator of energy, preferably a battery of accumulators, serving as a buffer.

By means of such an arrangement it is possible in the case of a three-phase supply, to distribute the load of the impulse uniformly over the three phases by means of the three-phase-continuous current converter or rectifier and in the case of a continuous current supply to connect the resistance welding machine directly. Further, with this arrangement, it is also possible to keep the impulses away from the network by means of a battery of accumulators.

Figure 1:
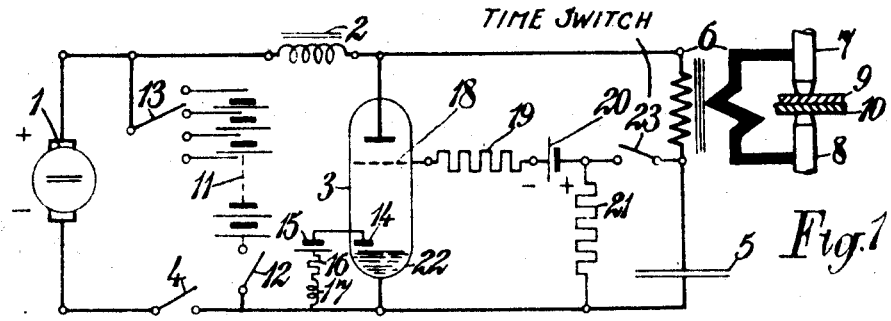
Figure 2:
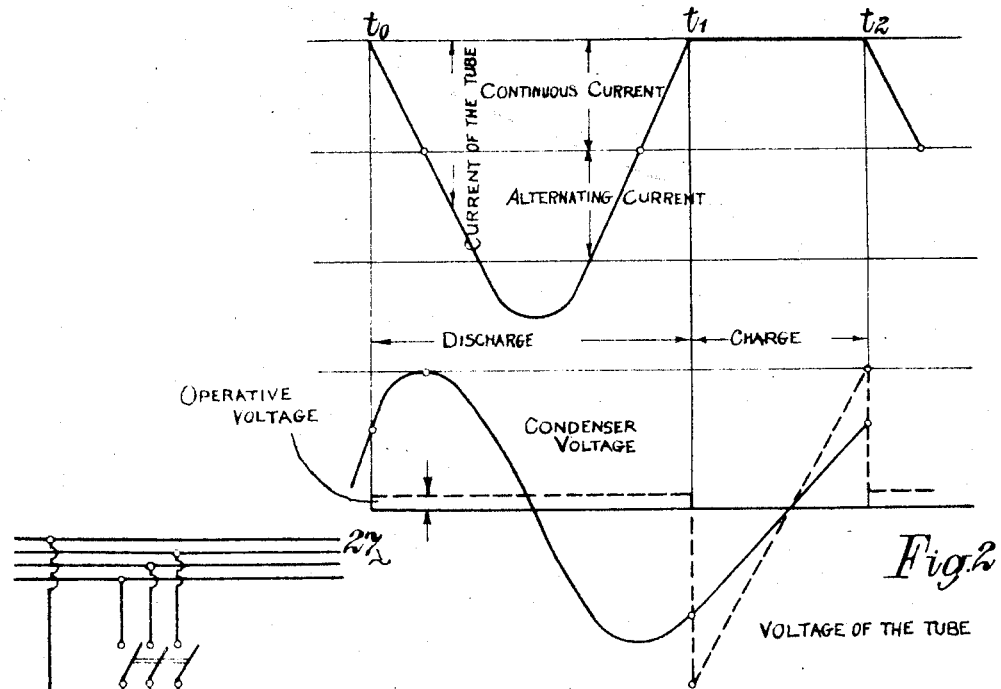
Figure 3:
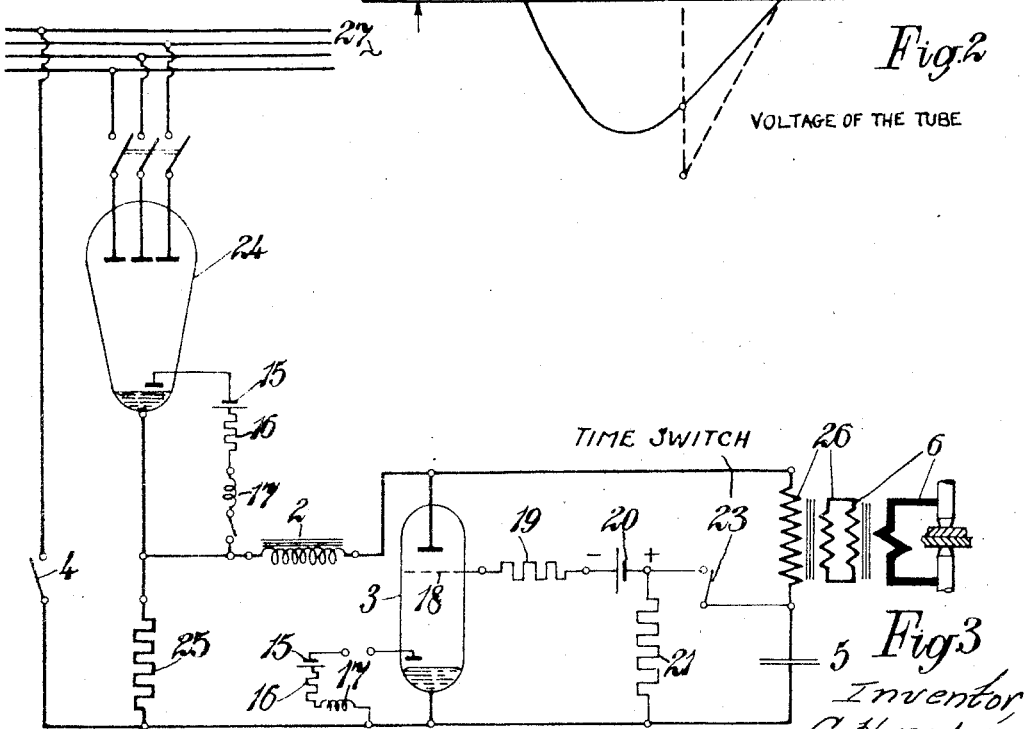

The invention is illustrated diagrammatically and by way of example in the accompanying drawing, in which Fig. 1 is a diagram of connections of an electric resistance welding installation for medium and high frequencies with a tube generator for continuous current supply;

Fig. 2 is a diagram showing the current and voltage characteristics of the arrangement shown in Figure 1; and Fig. 3 is a second arrangement of an electric resistance welding installation for medium and high frequencies with tube generator, in the case of a three-phase supply through a rectifier.

Referring to the arrangement shown in Figure 1, the installation comprises a source of continuous current 1, a choking coil 2, a controlling tube 3 and a main switch 4, all of which form a continuous current circuit, and an alternating current circuit connected in parallel with the controlling tube 3 and consisting of a condenser 5 and the primary of a welding transformer 6. The welding electrodes are illustrated at 7 and 8 and 9 and 10 are the parts to be welded together. A buffer battery 11 is connected in parallel with the controlling tube 3, the connection being effected by means of a switch 12. The switch 13 serves for the purpose of regulating the voltage of the buffer battery. An auxiliary anode 14 required in the case of mercury vapour tubes, which anode is connected to the cathode through the battery 15, a resistance 16 and a self-inductance 17. The grid 18 of the controlling tube is connected through a resistance 19, a battery 20, and a second resistance 21 to the cathode 22. The two ends of the resistance 21 are connected over a switch 23 to the condenser 5. The primary of the welding transformer 6 is connected at one end to the main anode of the controlling tube 3 and to a point between the switch 23 and the condenser 5.

With the power required for normal resistance welding, gas or vapour discharge tubes such as mercury vapour tubes, are preferably used. The controlling tube essentially represents a variable ohmic resistance which, when the tube is in operation, is less than $\frac{1}{10}$ ohm, increasing to an infinite value when the tube is extinguished. Such a variable resistance traversed by current allows continuous current and alternating current energy to be exchanged. At the same time the resistance is the seat of an alternating electro-motive force. The object of the choking coil 2 is to keep the alternating current away from the source of continuous current.

As soon as the main switch 4 is closed the condenser 5 is charged. By igniting the tube 3 by means of a positive grid voltage a continuous current starts to flow through the tube at the time $t_0$. By choosing suitable constants for the alternating current circuit containing the condenser 5, the latter discharges as a periodic oscillation. The continuous and alternating current flow first of all in the same direction through the tube, then the alternating current changes its direction, reaching finally the value of the continuous current at the time $t_1$ as shown in Fig. 2. At this moment the arc is extinguished. The grid, the potential of which with respect to the cathode is dependent upon the potential of the condenser 5 and battery 20, reaches a stopping potential immediately after the ignition and prevents immediate re-ignition. After the arc has been extinguished the condenser starts to be charged again. The continuous current remains practically constant owing to the large choking coil 2. When the condenser reaches a sufficiently high voltage, the grid 18 of the tube 3 also attains ignition potential and the operation is repeated from $t_2$. Naturally the voltage of the battery 20 must be smaller than the continuous current voltage of the source 1. The oscillations may be started and interrupted by means of the switch 23. By constructing the switch as a time switch it can determine the period of welding.

Naturally the grid may be connected up in many other ways. The installation is mainly intended for comparatively high frequency since, in that case, the condenser 5 can be made small. At the same time, the advantage is obtained that the welding transformer 6 may be made small and light.

The welding impulses can be absorbed if, according to the invention, a battery of accumulators 11 is connected in parallel with the source of continuous current 1 through a switch 13. The voltage of the source of continuous current is adjusted to be so high when it runs idle that a definite charge current flows through the battery. When there is a welding impulse the battery absorbs any desired proportion thereof so long as the voltage drop of the source of continuous current is correspondingly adjusted.

If the installation is fed from a three-phase network 27, as is illustrated in Figure 3, use is preferably made of a source of continuous current in the form of a rectifier 24 and an auxiliary load 25. In order to make use of small discharge vessels, it is advisable to provide an intermediate transformer 26, since the size of the tube depends preponderantly upon the current intensity. On the other hand, however, a certain voltage on the welding transformer 6 must not be exceeded in order to avoid danger.

A buffer battery may also be used with the installation connected up to a three-phase network, but even without such a battery the arrangement has the great advantage that it distributes the alternating current energy absorbed by the welding machine uniformly over the three-phase network.

While the invention has been described with reference to welding apparatus and as including various apparatus elements it will be appreciated that changes may be made therein and that the invention may be used for other purposes. Such modifications may be made without departing from the spirit and scope of the invention as set forth in the appended claims.

What I claim is:

1. In a resistance welding system, a load transformer having a primary winding, a condenser connected in series circuit relation with respect to the primary winding, a grid controlled gaseous discharge tube having a cathode and an anode connected across the condenser and the primary winding so that the tube is arranged in parallel circuit relation with respect to the primary winding and the condenser to provide an oscillating circuit, a source of direct current, a circuit for connecting said source across the anode and cathode of said tube, a choke coil arranged in said circuit, a grid biasing circuit connected to said tube, and a switch for connecting said grid biasing circuit to said oscillating circuit between the primary winding and the condenser.

2. In a resistance welding system, a welding transformer having a primary winding, a condenser connected in series circuit relation with respect to the primary winding, a grid controlled gas filled discharge tube having a cathode and an anode connected across the condenser and the primary winding so that the tube is arranged in parallel circuit relation with respect to the primary winding and the condenser to provide an oscillating circuit, a source of direct current, a circuit for connecting said source across the anode and cathode of said tube, a choke coil arranged in said circuit, a grid biasing circuit connected to said tube, and a time switch for connecting said grid biasing circuit to said oscillating circuit between the primary winding and the condenser.

3. In an electrical control system, a load transformer having a primary winding, a condenser connected in series circuit relation with the primary winding, a grid controlled mercury vapor discharge tube having a cathode and an anode connected across the condenser and the primary winding so that the tube is arranged in parallel circuit relation with respect to the primary winding and the condenser to provide an oscillating circuit, a source of current, a circuit for connecting said source across the anode and cathode of said tube, a choke coil arranged in said circuit, a grid biasing circuit connected to said tube, a switch connecting said grid biasing circuit to said oscillating circuit between the primary winding and the condenser, and energy absorbing means connected across said source.

4. In an electrical control system, a load transformer having a primary winding, a condenser connected in series circuit relation with the primary winding, a grid controlled gas-filled discharge tube having a cathode and an anode connected across the condenser and the primary winding so that the tube is arranged in parallel circuit relation with respect to the primary winding and the condenser to provide an oscillating circuit, a source of direct current, a circuit for connecting said source across the anode and cathode of said tube, a choke coil arranged in said circuit, a grid biasing circuit connected to said tube, a switch connecting said grid biasing circuit to said oscillating circuit between the primary winding and the condenser, and a battery connected across said source.

5. In an electrical control system, a load transformer having a primary winding, a condenser connected in series circuit relation with respect to the primary winding, a grid controlled gaseous discharge tube having a cathode and an anode connected across the condenser and the primary winding so that the tube is arranged in parallel circuit relation with respect to the primary winding and the condenser to provide an oscillating circuit, a source of alternating current, a rectifier for converting the alternating current into direct current, a circuit for impressing the direct current across the anode and cathode of said tube, a choke coil arranged in said circuit, a grid biasing circuit connected to said tube, and a switch for connecting said grid biasing circuit to said oscillating circuit between the primary winding and the condenser.

6. In an electrical control system, a load transformer having a primary winding, a condenser connected in series circuit relation with respect to the primary winding, a grid controlled gaseous discharge tube having a cathode and an anode connected across the condenser and the primary winding so that the tube is arranged in parallel circuit relation with respect to the primary winding and the condenser to provide an oscillating circuit, a polyphase source of alternating current, a circuit including a rectifier and an auxiliary load connected to said source, a circuit connecting said auxiliary load in parallel circuit relation with respect to said tube, a choke coil arranged in the last mentioned circuit, a grid biasing circuit connected to said tube, and a switch connecting said grid biasing circuit to said oscillating circuit between the primary winding and the condenser.

GERHARD HAGEDORN.